United States Patent [19]

Walter et al.

[11] Patent Number: 4,534,794
[45] Date of Patent: Aug. 13, 1985

[54] SALT CORROSION INHIBITORS

[75] Inventors: Robert J. Walter, Thousand Oaks; Bernard J. Gerik, Canoga Park, both of Calif.

[73] Assignee: Rockwell International Corporation, El Segundo, Calif.

[21] Appl. No.: 263,646

[22] Filed: May 14, 1981

[51] Int. Cl.$^3$ ................................................. C09D 5/18
[52] U.S. Cl. ............................. 106/14.05; 106/286.7; 148/6.11; 148/15.5
[58] Field of Search .......................... 106/14.05, 286.7; 148/6.11, 15.5

[56] References Cited

U.S. PATENT DOCUMENTS

| | | | |
|---|---|---|---|
| 1,379,722 | 5/1921 | Richardson | 148/15.5 |
| 1,840,562 | 1/1932 | Bridges | 148/6.11 |
| 1,879,701 | 9/1932 | Marino | 148/6.11 |
| 1,980,152 | 11/1934 | Beck et al. | 148/6.15 |
| 2,271,375 | 1/1942 | MacKay | 148/6.11 |
| 3,415,691 | 12/1968 | Vyas | 148/6.11 |

Primary Examiner—Lorenzo B. Hayes
Attorney, Agent, or Firm—H. Fredrick Hamann; Harry B. Field

[57] ABSTRACT

A salt system having a reduced rate of corrosion comprises a salt selected from the group consisting of $KNO_3$, $NaNO_3$ and mixtures thereof, and a minor amount of a corrosion inhibitor selected from the group consisting of $Li_2O$, $Na_2O$, $CuO$, $MgO$, $NiO$, $CaO$, $Al_2O_3$, $Cr_2O_3$, $SiO_2$, $Mn_3O_4$, $Ti_2O_3$, $Y_2O_3$, $Na_2CrO_4$, $Na_2Cr_2O_7$, $K_2CrO_4$, $K_2Cr_2O_7$, and mixtures thereof.

1 Claim, No Drawings

SALT CORROSION INHIBITORS

BACKGROUND OF THE INVENTION

1. Field of the Invention

This invention pertains to corrosion inhibitors which can be added to a molten salt so as to retard the corrosive effects on mild and low alloy steels.

2. Description of the Prior Art

The $KNO_3$-$NaNO_3$ salts are candidates to replace organic fluids as the heat storage media in the next generation solar energy plants. These salts are attractive because of their wide liquid temperature range and comparatively low cost but have a disadvantage of being highly corrosive to carbon steels. Although comparatively expensive corrosion resistant alloys, such as Incoloy 800 are now favored for storage vessel construction, low-alloy steels would offer significant cost advantages for storage vessels construction if corrosion can be reduced to an acceptable level.

In the past, corrosion inhibitors have been applied to the material to be protected and as such have failed to reach all areas subject to attack. Also, once inhibitor deterioration occurred, there was no way to reapply the inhibitors without breaking down the system and replacing or recoating damaged components.

SUMMARY OF THE INVENTION

Accordingly, there is provided by the present invention a salt system which significantly reduces the rate of corrosion of iron base alloys. The salt system comprises a salt such as $KNO_3$,$NaNO_3$ and mixtures thereof and a corrosion inhibitor or a mixutre of corrosion inhibitors such as $Li_2O$, $Na_2O$, $CuO$, $MgO$, $NiO$, $CaO$, $Al_2O_3$, $SiO_2$, $Mn_3O_4$, $Ti_2O_3$, $Y_2O_3$ and mixtures thereof.

OBJECTS OF THE PRESENT INVENTION

Therefore, it is an object of the present invention to provide a salt system which has reduced corrosion effects on iron base alloys.

Another object of the present invention is to provide a continuous means for providing a protective oxide layer on iron base alloys during exposure to the molten salt.

Still another object of the present invention is to decrease the rate of Fe ion migraton into the surface oxide.

Yet a further object of the present invention is to reduce the rate of oxygen permeation through the oxide.

Other objects, advantages and novel features of the present invention will become apparent from the following detailed description of the invention.

DESCRIPTION OF THE PREFERRED EMBODIMENTS

In accordance with the present invention there is provided a means for reducing the corrosive effect of salts on mild and low alloy steels. Salts of $KNO_3$,$NaNO_3$ and mixtures thereof are being considered for replacing organic fluids as the energy storage media in solar energy plants. However, to effect a viable salt system, the corrosive effects of these salts on mild and low alloy steels must be reduced.

Alloy additions for improving oxidation resistance of steels are based on either reducing the diffusion rate of iron through the oxide or reducing the transport of oxygen into the oxide. The first oxide to form is FeO (Wustite) which adheres well under stress. Next to form is $Fe_3O_4$, magnetite, which is adherent but spalls under stress. The highest oxidation state is $Fe_2O_3$, hematite, which spalls with or without stress.

FeO and $Fe_3O_4$ are metal-deficit (p type) semi conductors, and the rate determining step for oxide buildup is either transport of Fe ions into the oxide or formation of Fe vacancies in the oxide lattice. Oxidation is either a logarithmic function of time for Fe ion transport or a linear function of time for Fe vacancy formation dependency. To reduce the rate of FeO and $Fe_3O_4$ formation, low valency alkalii and alkalii earth metals are added to the oxide.

$Fe_2O_3$ is a metal-excess (n type) semi-conductor and the rate determining oxidation step is transportation of $O^=$ through the $Fe_2O_3$ lattice. Oxidation follows a parabolic rate relationship and the rate is decreased by the addition of high valency metal atoms. In actuality stainless steels have very low oxygen permeation by developing complex aluminum and chromium oxides.

Table 1 summarizes the potential iron corrosion inhibitors based on the above discussion. Ion radii are included in the table because, for substitution to occur, the metal atoms must be sufficiently small to substitute for iron in the oxide lattice. This requirement eliminates all except $Na^+$, $Li^+$, and possibly $K^+$ of the alkalii metal group. $Cu^{++}$, $Mg^{++}$, $Ni^{++}$ and $Cu^+$ are bivalent ions with radii similar to the $Fe^{++}$ and $Fe^{+++}$ ions radii and are, therefore, candidates. $Cr^{+++}$, $Al^{+++}$, $Mn^{+++}$, $Ti^{+++}$, and $Sn^{++++}$ are candidates because they form oxygen impervious oxides. $Y^{+++}$ is a potential candidate because a small addition of yttria ($Y_2O_3$) improves oxide adherence in stainless steels. $Si^{++++}$ is included because siliciding and aluminizing are methods for protecting metals from elevated temperature oxidizing environments.

Test results indicate potential benefit from addition of low valency metals to the molten salt, and the logarithmic relationship corresponds to Fe ion transport dependency. The benefit obtained from the addition of CaO and the apparent insolubility of CaO in the eutectic salt indicates that calcium was absorbed into the iron oxide as CaO colloidal particles. Thus, most of the metal ion salt additions were made in the form of oxide powders at sufficient concentration to exceed the oxide solubility in the salt at its melting point. The preferred concentrations of oxide powders is in excess of the oxide solubility in the salt at about 550° F., the most preferred concentration is in excess of the oxide solubility in the salt at the working temperature of about 1050° F.

TABLE 1

IONIC RADII AND SOLUBILITIES OF POTENTIAL IRON CORROSION INHIBITORS

| ION | ION RADII | OXIDE SOLUBILITY (WT. PERCENT) IN BINARY EUTECTIC | |
|---|---|---|---|
| | | 550 F | 1,050 F |
| $Fe^{++}$ | 0.87 | — | — |
| $Fe^{+++}$ | 0.67 | — | — |
| $Li^+$ | 0.78 | — | — |
| $Na^+$ | 0.98 | 0.66 | 8.5 |
| $K^+$ | 1.33 | — | — |
| $Be^{++}$ | 0.34 | — | — |
| $Cu^{++}$ | 0.72 | — | — |
| $Mg^{++}$ | 0.78 | — | — |
| $Ni^{++}$ | 0.78 | NIL | NIL |
| $Ca^{++}$ | 1.06 | — | <0.1 |
| $Sr^{++}$ | 1.27 | — | — |
| $Ba^{++}$ | 1.43 | — | — |

TABLE 1-continued

IONIC RADII AND SOLUBILITIES
OF POTENTIAL IRON CORROSION INHIBITORS

| ION | ION RADII | OXIDE SOLUBILITY (WT. PERCENT) IN BINARY EUTECTIC | |
|---|---|---|---|
| | | 550 F | 1,050 F |
| $Al^{+++}$ | 0.57 | — | ≈0.2 |
| $Cr^{+++}$ | 0.64 | 0.0015 | 5.1 |
| $Mn^{+++}$ | 0.66 | — | — |
| $Ti^{+++}$ | 0.69 | — | — |
| $Y^{+++}$ | 1.06 | — | — |
| $Si^{++++}$ | 0.39 | — | — |
| $Sn^{++++}$ | 0.71 | — | — |

Specifically, the low valency metal oxides of the present invention include $Li_2O$, $Na_2O$, $K_2O$, $BeO$, $CuO$, $MgO$, $NiO$, $CaO$, $SrO$, and $BaO$, while the high valency metal oxides include $Al_2O_3$, $Cr_2O_3$, $Mn_3O_4$, $Ti_2O_3$, $Y_2O_3$, and $SiO_2$. Complex oxides containing both low and high valence metal ions such as $Na_2CrO_4$, $Na_2Cr_2O_7$, $K_2CrO_4$, and $K_2Cr_2O_7$ are also included in this invention. Of the above-mentioned metal oxides, those of $Li_2O$, $Na_2O$, $CuO$, $MgO$, $NiO$, $CaO$, $Al_2O_3$, $SiO_2$, $Mn_3O_4$, $Ti_2O_3$, and $Y_2O_3$ are preferred.

Other salt systems which could have their corrosive effects reduced to more acceptable levels include $Na/ZnCl_2$, $K/MgBr_2$, $Li_2/K_2/Na_2CO_3$, and $Li/Na/KF$.

By way of example and not limitation, the following test have been conducted and analyzed:

AISI 1010 carbon steel specimens were exposed to binary eutectic salt for various durations at 1050 F. In the absence of inhibitors, oxide blistering and flaking was observed after 100-hour exposure and a thick, multilayered oxide, developed on specimens exposed for over 1000-hour duration. By contrast, when certain molten salt inhibitors were added to the bath, protective adherent oxides were maintained when the specimens were exposed for over 1000 hours of testing at 1050 F. with daily (5 times/week) temperature excursions to 550 F. Without thermal cycling, there was a significant reduction of corrosion by the addition of inhibitors, but even greater inhibitor benefits occurred with thermal cycling. The importance of thermal cycling indicates that additive absorption initiates from precipitation onto the specimen surfaces during cooling. With 2% $Al_2O_3$ addition, an adherent oxide was present over virtually the entire surface following 1594-hour exposure. Exposure for 2006 hours to binary eutectic salt containing 2 percent $CuO$ produced a few small blisters, but underneath the blisters the oxide appeared smooth and adherent with very little surface distortion.

Table 2 summarizes the thickness reduction of low alloy steels during exposure to the binary salts. The rate of attack in uninhibited salt is about 0.12-inch per year as derived from the time to produce leakage in Armco Iron crucibles immersed in an uninhibited salt bath. The continual oxide formation and flaking of the AISI 1010 specimens exposed to uninhibited salt make estimation of actual thickness reduction more uncertain than can be obtained from the point of leakage of the Armco Iron crucibles. On the other hand, the reduction of thickness of the AISI 1010 specimens can be calculated from the increased thickness of adherent oxide which developed during exposure to the binary salt containing corrosion inhibitors.

TABLE 2

REDUCTION OF LOW ALLOY STEEL THICKNESS FROM EXPOSURE TO $KNO_3$—$NaNO_3$ SALT AT 1050F

| Source | Loss Inch per Year | Loss Inch per 30 Years |
|---|---|---|
| Time to produce leakage in Armco Iron Crucibles Immersed in Uninhibited Salt | 0.12 | 3.6 |
| AISI 1010 specimens exposed to Inhibited Salt (Oxide remains adherent 1000 hours and then reforms) | 0.01 | 0.30 |
| AISI 1010 specimens exposed to Inhibited Salt (Oxide remains adherent 4383 hrs (½ yr) and then reforms | 0.0032 | 0.10 |

On this basis, without corrosion inhibitors steel vessel walls in contact with the binary salt at 1050 F. would be reduced about 0.12-inch per year or about 3.6 inches for the 30-year design life, which is obviously completely unacceptable for long duration thermal storage. With the Rocketdyne inhibited salts, the current state-of-the-art is complete protection for at least 1000 hours. If oxide adherence were extended to ½ year periods, which is a reasonable goal, and an adherent oxide reforms, the thickness decrease would be 3.2 mils per year and 96 mils over a 30-year period. Since the oxide thickness increases as a logarithmic time relationship, a small improvement of oxide adherency produces a large increase of adherency duration. Thus, extension of adherency for over one-year duration, which would produce less than 50 mil thickness reduction over a 30-year period, would appear possible.

Obviously, many modifications and variations of the present invention are possible in light of the above teachings. It is, therefore, to be understood that, within the scope of the appended claims, the invention may be practiced otherwise than as specifically described.

What is claimed and desired to be secured by Letters Patent of the United States is:

1. The salt system which significantly retards corrosion of mild and low alloy steels comprising a salt selected from the group consisting of $KNO_3$, $NaNO_3$ and mixtures thereof and a corrosion inhibitor comprising an intimate mixture of a low valence metal oxide selected from the group consisting of $Li_2O$, $Na_2O$, $CuO$, $MgO$, $NiO$, $CaO$, and mixtures thereof, and a high valence metal oxide selected from the group consisting of $Al_2O_3$, $Cr_2O_3$, $SiO_2$, $Mn_3O_4$, $Ti_2O_3$, $Y_2O_3$, and mixtures thereof.

* * * * *